May 20, 1924.
C. R. CARY
METHOD OF AND APPARATUS FOR MEASURING TEMPERATURES
Filed Feb. 26, 1921    2 Sheets-Sheet 1
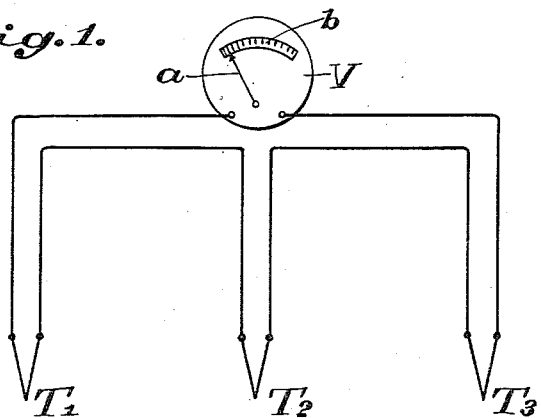
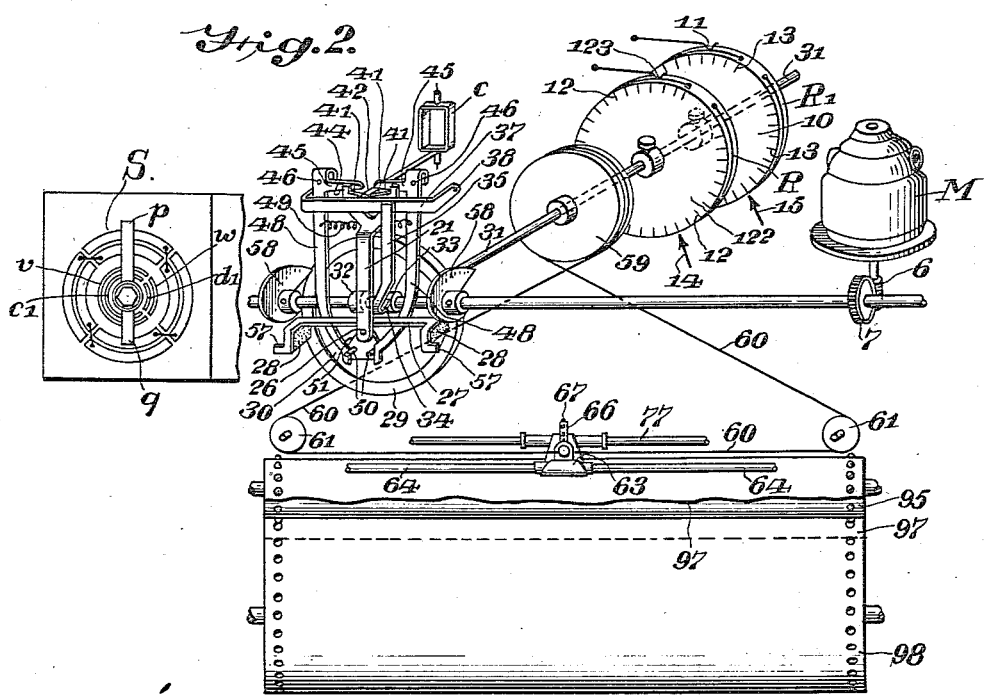
INVENTOR.
Charles R. Cary
BY
Cornelius L. Ehret
his ATTORNEY.

May 20, 1924.

C. R. CARY 1,494,586

METHOD OF AND APPARATUS FOR MEASURING TEMPERATURES

Filed Feb. 26, 1921   2 Sheets-Sheet 2

INVENTOR.
Charles R. Cary
BY
Cornelius D. Ehret
his ATTORNEY.

Patented May 20, 1924.

1,494,586

UNITED STATES PATENT OFFICE.

CHARLES R. CARY, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

METHOD OF AND APPARATUS FOR MEASURING TEMPERATURES.

Application filed February 26, 1921. Serial No. 448,016.

*To all whom it may concern:*

Be it known that I, CHARLES R. CARY, a citizen of the United States, residing in the city and county of Philadelphia, State of Pennsylvania, have invented new and useful Improvements in Methods of and Apparatus for Measuring Temperatures, of which the following is a specification.

My invention relates to a method of and apparatus for measuring, recording or controlling temperature, as by thermo-electric or equivalent means.

In accordance with my invention, the average of a plurality of temperatures, such, for example, as may simultaneously exist at different places or points, is directly measured, recorded or employed for effecting any suitable control, by producing electro-motive-forces, as by thermo-electric or equivalent means, corresponding with the different temperatures, and causing such electromotive-forces to operate cumulatively upon a galvanometer or with a potentiometer, or equivalent arrangement, the galvanometer deflection corresponding with a temperature which is the average of the several temperatures.

Further in accordance with my invention, the several thermo-electric or equivalent means are controlled as to their relation with the galvanometer or other measuring or indicating means by switching mechanism which will bring each of the thermo-electric or equivalent means separately into relation with the galvanometer or indicating means and all of them in series.

Further in accordance with my invention, the individual temperatures and the average temperature are recorded, as by a multiple point recorder, on equal scales.

Further in accordance with my invention, the above described switching mechanism may be actuated or automatically controlled in association with the recorder mechanism.

Further in accordance with my invention, the temperature-responsive devices, as thermo-electric or equivalent means, may be brought individually or in series with each other into relation with a galvanometer, which latter, under the different conditions of individual and collective use of the temperature responsive devices, is brought into association with different potentiometer circuits or equivalents, the different potentiometers, or equivalents, preferably also being switched into and out of circuit in unison with the above mentioned switching mechanism.

My invention resides in the method and apparatus hereinafter described and claimed.

For an illustration of some of the various forms my invention may take, and for an understanding of my method, reference is to be had to the accompanying drawings, in which:

Fig. 1 illustrates a circuit arrangement for measuring the average of several temperatures.

Fig. 1ª is an illustration of a double scale for the galvanometer.

Fig. 2 is a fragmentary perspective view, partially in elevation, of recorder or control mechanism utilizable in accordance with my invention.

Figure 3:
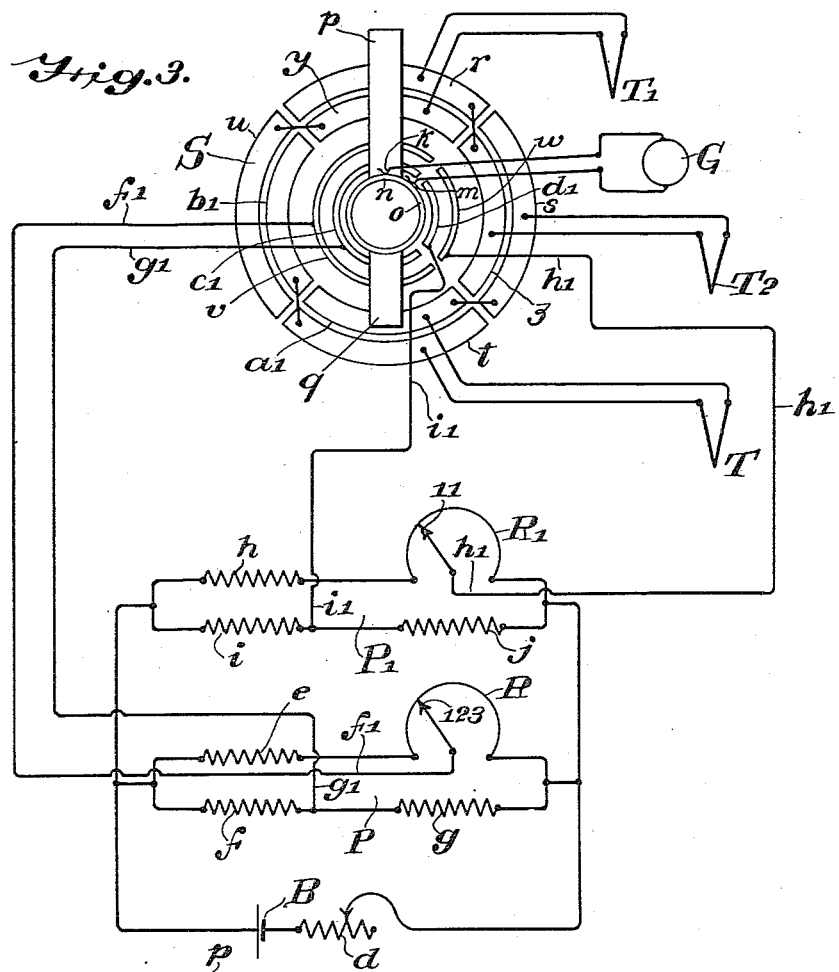
Fig. 3 is a diagrammatic view of the electrical circuits utilizable in connection with the recording or control mechanism.

Referring to Fig. 1, V is a voltmeter or millivoltmeter, or other suitable deflecting galvanometer, preferably of the D'Arsonval type, having the deflecting needle or pointer $a$, and the scale $b$. The thermo-junctions $T^1$, $T^2$ and $T^3$ are connected in series with each other and the galvanometer V, the cold junctions of the thermo-couples being preferably at the instrument V, this being accomplished, as well understood in the art, by using as leads from the thermo-junctions to the instrument conductors of the same materials of which the junctions are formed. The thermo-junctions are located at the different places or points the average of the temperatures at which is to be measured.

The thermo-junctions may be located at different points longitudinally of a slot of an armature of a dynamo-electric machine, and are preferably located between neighboring coils or conductors in the slot. Or the thermo-junctions may be located in any other different places, as in different bins or housings of a grain storage house or elevator; in different parts of a furnace, etc.

Each thermo-junction partakes of the temperature of the place where located, and produces an electro-motive-force corresponding to such temperature. By serially connecting the thermo-couples as indicated, the electro-motive-forces produced thereby operate cumulatively upon the galvanometer V, causing it to produce a deflection which corresponds with the sum of the electro-motive-forces produced by the different thermo-junctions, and such deflection is therefore a measure of the average of the several temperatures to which the several junctions are subjected. For example, if the galvanometer V were calibrated in millivolts and its deflection corresponded to say, 24 millivolts, the average temperature would be that corresponding with one-third, or 8 millivolts.

The scale $b$ of the galvanometer may be calibrated to read directly in average voltages, as by dividing each reading of the usual millivolt scale by a number corresponding with the number of thermo-junctions employed in series with each other. Or the scale may have, as indicated in Fig. 1$^a$, two graduations or scales $b$ and $c$, one of them as $c$ reading directly in the usual millivolts, and the other has $b$ in terms of such millivolts divided by the number of thermo-junctions in series. Or in lieu of either or both of the millivolt scales may be employed temperature scales. Thus, the scale $b$ may have two temperature scales, one employed when but one thermo-junction is in circuit with the instrument, and the other reading in average temperatures and employed when the several thermo-junctions are in series with the instrument. When the double scales are employed reading either in millivolts or temperatures, or both, switching mechanism of the character hereinafter described may be employed for connecting the thermo-junctions individually in circuit with the instrument or in series with each other as indicated.

For recording or control purposes, any suitable mechanism may be employed under the control of the thermo-junctions, or their equivalents.

In the example illustrated in Fig. 2, the recording or control mechanism may be of the character disclosed in Letters Patent of the United States No. 1,125,699, granted to M. E. Leeds January 19, 1915, for clearness only the principal parts being indicated in Fig. 2.

The governed electric motor M rotates the shaft 8 at uniform speed through the medium of the worm 6 and worm gear 7. Horizontally pivoted near its upper end is the lever 21, to which is pivoted at 26 the arm 27 having at each end a shoe 28, of cork or other suitable material, for frictionally engaging the rim 29 of the disk or wheel 30 secured upon the shaft 31 of the movable or controlled structure. Secured upon the shaft 8 is a cam 32, which periodically engages the lever 21 and lifts the shoes 28 from the rim of the wheel 30. Secured to the shaft 8 is a second cam 33 which, immediately after the cam 32 has lifted the shoes 28 from the wheel 30, engages the end of finger 34 upon the arm 35 secured to the frame 37 pivoted at 38. The frame 37 carries the member 40, between whose upper edge 41 and the lower edges 44 of members 45 is adapted to deflect laterally the needle or pointer 42 deflected by the coil $c$ of the galvanometer. The members 45 are integral with the downwardly extending members 48, drawn toward each other by spring 49, and pivoted at 46. The lower ends of the arms 48 co-act with the pins 50 on the plate 51 attached to the arm 27, which latter has the lugs or ears 57 with which co-act the cams 58 secured upon the shaft 8. Secured upon the shaft 31 is the wheel or pulley 59 around which is wrapped a cord 60 driven thereby and passing over idlers 61 and attached to the carriage or member 63 laterally slidable upon the guide rod 64.

The marker of the recorder may be of any suitable type, as a pen, pencil or other point or line-drawing or printing device. As here illustrated, it is the marker of a multiple point recorder, and takes the form of a wheel 66 carrying a plurality of types or other printing characters 67, in the example illustrated, where three temperature responsive devices are employed, there being four characters, one for each individual temperature responsive device, and another for the temperature responsive devices when connected in series with each other. The type wheel 66 is movable longitudinally of the shaft 77 by the carriage 63, and is rotated by the shaft 77, as described in said Letters Patent. The type wheel co-acts with the recorder paper 97 stored upon the roller 98 and unwound therefrom on to the roller 95. Secured upon the shaft 31 is the wheel or disk of insulating material 122 upon which is disposed the resistance conductor R, with which co-acts the stationary brush or contact 123. Similarly movable with the shaft 31 is the second resistance conductor $R^1$, which may be carried upon the disk 122 or which, as indicated, may be carried upon a separate disk 10, the stationary brush or contact 11 co-acting with the resistance $R^1$.

Switching mechanism S may be manually operated, or it may be operated in association with the recorder mechanism by the motor M, as is the switching mechanism 107 of said Letters Patent; that is, the rotatable structure of the switching mechanism S may be actuated and controlled, as in said Letters Patent, to cause it to take different positions, simultaneously with rotation of the type wheel 66 to different positions by the shaft 73.

In Fig. 3 the galvanometer G, whose coil $c$, is indicated in Fig. 2, is shown as related through the switching mechanism S with the split circuit potentiometers P and P¹ having, if desired, the common source of current or battery B connected with the potentiometers through the variable resistance or rheostat $d$. The potentiometer P comprises the aforesaid resistance R and resistance $e$ in one branch, and the resistances $f$ and $g$ in the parallel branch, the resistances R, $e$ and $g$ having preferably zero temperature co-efficients, while the resistance $f$ preferably has a positive temperature co-efficient and may consist of nickel, this arrangement being suitable for compensating for variation of temperature at the cold junctions of the thermo-junctions $T^1$, $T^2$ and $T^3$ in accordance with Letters Patent of the United States No. 1,199,724, September 26, 1916. Similarly, the potentiometer P¹ comprises the aforesaid resistance $R^1$ and resistance $h$, and in the parallel branch the resistances $i$ and $j$, the resistances $R^1$, $h$ and $j$ preferably having zero co-efficients, while the resistance $i$ may again be of nickel as in the case of potentiometer P.

Figure 4:
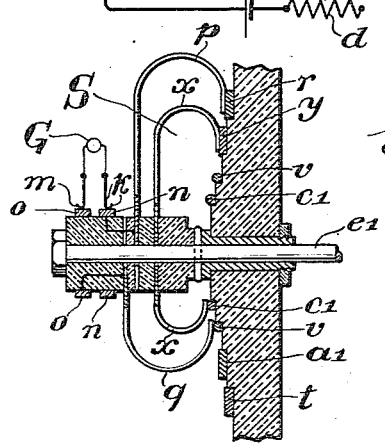
Fig. 4 is a cross sectional view, partly in elevation, of switching mechanism.

The terminals of the galvanometer G connect with the brushes $k$ and $m$ bearing, respectively, upon the slip rings $n$ and $o$, Figs. 3 and 4, the ring $n$ being permanently in electrical communication with the rotatable brush or contact $p$ and the slip ring $o$ being permanently in electrical communication with the brush or contact $q$, the brush $p$ in its above positions during rotation contacting with the switch contacts or segments $r$, $s$, $t$ and $u$, while the brush $q$ engages the switch contacts or segments $v$ and $w$, of which $v$ occupies approximately three-fourths of a circumference, and the contact $w$ one-fourth, when three thermo-junctions are employed. A third brush $x$, Fig. 3, bears with its one end upon the switch contacts or segments $y$, $z$, $a^1$ and $b^1$, while its other end bears upon the switch contacts or segments $c^1$ and $d^1$, positioned similarly to the contacts $v$ and $w$ and having similar angular extents. The slip rings $n$, $o$ and the brushes $p$, $q$ and $x$ are rotated in unison by the shaft $e^1$, which may be rotated by mechanism similar to that described in said Leeds Patent 1,125,699 for rotating the switch contact 107 thereof.

As indicated in Fig. 3, the segments or contacts $r$ and $z$ are connected together, as are also $s$, $a^1$; $t$, $b^1$; $u$, $y$.

The stationary brush or contact 123, coacting with the resistance R of potentiometer P, is connected by conductor $f^1$ with the aforesaid contact $v$, and the contact $c^1$ is connected by conductor $g^1$ with the other branch of the potentiometer P between resistances $f$ and $g$. Similarly, the stationary brush 11, co-acting with the resistance $R^1$ of the potentiometer P¹, connects by conductor $h^1$ with the contact $w$, and the contact $d^1$ is connected by conductor $i^1$ with the other branch of the potentiometer P¹ between the resistances $i$ and $j$.

With the switch brushes in the position indicated in Fig. 3, it will be found that the thermo-junction $T^1$ and galvanometer G are connected in series with each other and associated with the potentiometer P by connection between the brush 123 and a point between the resistances $f$ and $g$. With the switch brushes rotated in clockwise direction as viewed in Fig. 3 through a quarter of a revolution, the thermo-junction $T^2$ will be in series with the galvanometer G and similarly related to the potentiometer P. Upon a further quarter revolution the thermo-junction $T^3$ will be in series with the galvanometer G and similarly related to the potentiometer P. But upon a further quarter revolution, the potentiometer P will be out of circuit, and the thermo-junctions $T^1$, $T^2$, $T^3$ will be connected in series with each other and the galvanometer G between the brush 11 of the potentiometer P¹ and a point between its resistances $i$ and $j$.

Accordingly, the switching mechanism is such as to bring the different thermo-junctions successively into co-action with the galvanometer G and the potentiometer P, and then the three thermo-junctions in series with each other and the galvanometer G in relation to the potentiometer P¹.

The potentiometers P and P¹ differ as to the magnitudes of their resistances, the resistances of the potentiometer P being suited to the relatively lower electro-motive-force as produced by a single thermo-junction, while the resistances of the potentiometer P¹ are suited for co-action with relatively higher electro-motive-force, such as the sum of the electro-motive-forces of the several thermo-junctions.

The operation is as follows:

When any one of the thermo-junctions is in circuit, the apparatus indicated in Figs. 2 and 3 operates as described in said Letters Patent to Leeds, the apparatus automatically rotating the movable structure, comprising the shaft 31 and attached parts, in such direction and extent as to cause the resultant adjustment of the resistance R, by movement with respect to brush 123, to re-balance or tend to re-balance the potentiometer P, the movement for this purpose being communicated to the type wheel 66 to move it one way or the other laterally of the record sheet 97, the appropriate character corresponding with the particular thermo-junction in circuit being presented to the paper for printing a character thereon in the lateral position corresponding to the temperature to which the thermo-junction is then subjected. And so on, for each of the other thermo-junctions a different character is printed, each time in such lateral position as corresponds to the temperature to which the thermo-junction is subjected. However, periodically all the thermo-junctions are brought into series with each other and related to the potentiometer $P^1$, in which case the operation of the mechanism is similar, the resistance $R^1$ in this case re-balancing or tending to re-balance the potentiometer $P^1$ by movement of the resistance $R^1$ with respect to the stationary brush 11, the fourth character of the type wheel 66 being in this case presented to the paper or record sheet.

Accordingly, record is made of the different individual temperatures, and a separate record is made of the average temperature. Or, more broadly speaking, a record is made of each of a plurality of individual electro-motive-forces, and also a record of a composite electro-motive-force, as the average of the individual electro-motive-forces.

Associated with the resistance R, as by placing the same upon the disk 122, may be a scale 12 reading in terms of temperature, electro-motive-force, or both; and similarly, there may be associated with the resistance $R^1$, as by applying the same to the disk 10, a scale 13 reading in units of temperature or electro-motive-force, or both, the rotating scales co-acting with any suitable stationary indices or pointers, as 14, 15, whereby the electro-motive-forces or temperatures may be measured or read.

Whether or not the mechanism described produces a record, the movable structure, comprising shaft 31 and attached parts, is controlled in response to the individual temperatures and the average temperature or may be employed to effect any suitable control, as a control which will modify the individual electro-motive-forces or their average or composite electro-motive-force; or it may control the application of a heating agent to vary or control the individual temperatures or to vary or control the average temperature.

For these purposes temperature control apparatus such as disclosed in Letters Patent No. 1,332,182 and No. 1,356,084, to Leeds and Brewer, respectively, or for variation or control of electro-motive-force, as disclosed in Keeler application Serial No. 374,267, may be employed.

What I claim is:

1. The method of control which consists in producing electro-motive-forces representative of different magnitudes of a condition, causing said electro-motive-forces to operate cumulatively, impressing the composite electro-motive-force upon a control instrument to produce a deflection thereof representative of the average of said magnitudes, and effecting a control by said deflection.

2. The method of control which consists in producing a plurality of electro-motive-forces representative of different temperatures, causing said electro-motive-forces to operate cumulatively, impressing the composite electro-motive-force upon an instrument whose deflection is representative of the average of said temperatures, and effecting a control by said deflection.

3. Apparatus for effecting a control in response to the average of a plurality of magnitudes of a condition, comprising means producing an electrical effect varying with variations of each magnitude, a deflecting member responsive to the cumulative effect of said electrical effects, a movable structure, means for moving said structure, and means controlled by said deflecting member controlling the co-action of said movable structure and said means for moving it.

4. Apparatus for effecting a control in response to the average of a plurality of temperatures, comprising means producing an electro-motive-force varying with variations of each temperature, a galvanometer subjected to the sum of said electro-motive-forces, a movable structure, a source of power for moving the same, and means controlled by said galvanometer controlling actuation of said movable structure by said source of power.

5. Apparatus for effecting a control in response to the average of a plurality of temperatures, comprising a thermo-junction subjected to each temperature, a balancing circuit, a galvanometer therefor, means connecting said thermo-couples in series with each other and said galvanometer, a movable structure, a source of power, and means controlled by said galvanometer controlling actuation of said movable structure by said source of power.

6. Apparatus recording individual magnitudes of a condition and their average comprising a marker, means for moving the same, a galvanometer controlling said means, an electrical device responsive to each of said magnitudes, and switching mechanism operated by said means for relating said galvanometer to said responsive devices individually and collectively.

7. Apparatus for recording individual temperatures and their average comprising a marker, means for moving the same, a galvanometer controlling said means, a thermo-couple subjected to each of said temperatures, and switching mechanism actuated by said means connecting said thermo-couples with said galvanometer individually and collectively.

8. Apparatus for recording individual temperatures and their average comprising a thermo-couple subjected to each of said temperatures, a galvanometer, a marker controlled by said galvanometer, a plurality of potentiometers, and switching mechanism for relating said galvanometer and said thermo-couples individually with one of said potentiometers and for connecting said thermo-couples in series with each other and said galvanometer and relating them to another of said potentiometers.

9. Apparatus for measuring the average of a plurality of temperatures comprising a thermo-couple subjected to each temperature, means for connecting said thermo-couples in series with each other to render their electro-motive-forces cumulative, a deflecting galvanometer subjected to the cumulative effect of said electro-motive-forces, and a scale for said galvanometer calibrated in units of averages of said electro-motive-forces.

10. Apparatus for measuring the average of a plurality of temperatures comprising a thermo-couple subjected to each temperature, means for connecting said thermo-couples in series with each other to render their electro-motive-forces cumulative, a deflecting galvanometer subjected to the cumulative effect of said electro-motive-forces, and a scale for said galvanometer calibrated in units of averages of said temperatures.

11. Apparatus for measuring magnitudes of a condition individually and collectively, comprising a plurality of electrical devices subjected, respectively, to the different magnitudes of the condition, a plurality of balancing circuits, and switching mechanism for relating a plurality of said electrical devices individually with one of said balancing circuits and for relating a plurality of said electrical devices simultaneously with another of said balancing circuits.

12. Apparatus for measuring individual magnitudes of a condition and their average, comprising a plurality of electrical devices subjected, respectively, to the different magnitudes of the condition, a plurality of balancing circuits, and switching mechanism for relating a plurality of said electrical devices individually with one of said balancing circuits and for relating a plurality of said electrical devices in series with each other to another of said balancing circuits.

13. Apparatus for measuring magnitudes of a condition individually and collectively, comprising a plurality of electrical devices subjected, respectively, to the different magnitudes of the condition, a plurality of balancing circuits, a galvanometer, and switching mechanism for relating a plurality of said electrical devices individually with one of said balancing circuits and said galvanometer and for relating a plurality of said electrical devices simultaneously with said galvanometer and another of said balancing circuits.

14. Apparatus for measuring individual magnitudes of a condition and their average, comprising a plurality of electrical devices subjected, respectively, to the different magnitudes of the condition, a plurality of balancing circuits, a galvanometer, and switching means for relating a plurality of said electrical devices individually with one of said balancing circuits and said galvanometer and for relating a plurality of said electrical devices in series with each other to said galvanometer and another of said balancing circuits.

15. Apparatus for measuring magnitudes of a condition individually and collectively, comprising a plurality of electrical devices subjected, respectively, to the different magnitudes of the condition, a plurality of balancing circuits, a source of current common to said balancing circuits, and switching mechanism for relating a plurality of said electrical devices individually with one of said balancing circuits and for relating a plurality of said electrical devices simultaneously with another of said balancing circuits.

16. Apparatus for measuring individual magnitudes of a condition and their average, comprising a plurality of electrical devices subjected, respectively, to the different magnitudes of the condition, a plurality of balancing circuits, a source of current common to said balancing circuits, and switching mechanism for relating a plurality of said electrical devices individually with one of said balancing circuits and for relating a plurality of said electrical devices in series with each other to another of said balancing circuits.

17. Apparatus for measuring magnitudes of a condition individually and collectively, comprising a plurality of electrical devices subjected, respectively, to the different magnitudes of the condition, a plurality of balancing circuits, a source of current common to said balancing circuits, a galvanometer, and switching mechanism for relating a plurality of said electrical devices individually with one of said balancing circuits and said galvanometer and for relating a plurality of said electrical devices simultaneously with said galvanometer and another of said balancing circuits.

18. Apparatus for measuring individual magnitudes of a condition and their average, comprising a plurality of electrical devices subjected, respectively, to the different magnitudes of the condition, a plurality of balancing circuits, a source of current common to said balancing circuits, a galvanometer, and switching means for relating a plurality of said electrical devices individually with one of said balancing circuits and said galvanometer and for relating a plurality of said electrical devices in series with each other to said galvanometer and another to said balancing circuits.

19. Apparatus for measuring temperatures individually and collectively, comprising a plurality of electrical temperature-responsive devices subjected, respectively, to the different temperatures, a plurality of balancing circuits, and switching mechanism for relating said devices individually to one of said balancing circuits and collectively to another of said balancing circuits.

20. Apparatus for measuring individual temperatures and their average comprising a plurality of electrical temperature-responsive devices subjected, respectively, to the different temperatures, a plurality of balancing circuits, and switching mechanism for relating said devices individually to one of said balancing circuits and in series with each other to another of said balancing circuits.

21. Apparatus for measuring temperatures individually and collectively comprising a plurality of thermo-couples subjected, respectively, to the different temperatures, a plurality of potentiometer circuits, and switching mechanism for relating said thermo-couples individually to one of said potentiometer circuits and collectively to another of said potentiometer circuits.

22. Apparatus for measuring individual temperatures and their average comprising a plurality of thermo-couples subjected, respectively, to the different temperatures, a plurality of potentiometer circuits, and switching mechanism for relating said thermo-couples individually to one of said potentiometer circuits and in series with each other to another of said potentiometer circuits.

23. Apparatus for recording magnitudes of a condition individually and collectively comprising recording mechanism comprising a record sheet and marking mechanism, a plurality of electrical devices subjected, respectively, to the different magnitudes of the condition, a plurality of balancing circuits, and switching mechanism for bringing said recording mechanism under control of said balancing circuits individually and for relating said electrical devices individually with one of said balancing circuits and collectively with another of said balancing circuits, said balancing circuits being so related that said marking mechanism produces on said record sheet records on the same scale for all said magnitudes individually and collectively.

24. Apparatus for recording magnitudes of a condition individually and collectively comprising a recorder comprising a record sheet and marking mechanism having a plurality of marking elements, a plurality of electrical devices subjected, respectively, to the individual magnitudes of the condition, a plurality of balancing circuits, switching mechanism for bringing said recorder under control of said balancing circuits individually and for relating said electrical devices individually to one of said balancing circuits and collectively to another of said balancing circuits, and means for operating said switching mechanism and said marking mechanism to cause different marking elements to be presented to said record sheet when different of said electrical devices are related to one of said balancing circuits and for bringing another element of said marking mechanism into operative relation with said record sheet when said electrical devices are collectively related to another of said balancing circuits.

In testimony whereof I have hereunto affixed my signature this 24th day of February, 1921.

CHARLES R. CARY.